United States Patent [19]

Nelson

[11] Patent Number: 4,900,217

[45] Date of Patent: Feb. 13, 1990

[54] STOWABLE, MULTIPLE GRADE RAMPING DEVICE

[76] Inventor: Jon N. Nelson, Rte. 1, Box 1000, Stewartville, Minn. 55976

[21] Appl. No.: 219,920

[22] Filed: Jul. 15, 1988

[51] Int. Cl.⁴ .............................................. B65G 67/02
[52] U.S. Cl. .................................... 414/537; 14/71.1; 296/26
[58] Field of Search ............... 414/537, 538, 469, 470, 414/477, 522, 532; 296/51, 61, 62, 26; 14/71.1

[56] References Cited

U.S. PATENT DOCUMENTS

| 3,642,156 | 2/1972 | Stenson | 296/61 |
| 3,870,170 | 3/1975 | Noble et al. | 414/537 |
| 4,124,131 | 11/1978 | Torneback | 414/522 |
| 4,527,941 | 7/1985 | Archer | 414/537 |
| 4,601,632 | 7/1986 | Agee | 414/537 |
| 4,624,619 | 11/1986 | Uher | 414/537 |
| 4,628,561 | 12/1986 | Kushniryk | 414/537 X |
| 4,685,857 | 8/1987 | Goeser et al. | 414/537 X |

Primary Examiner—Robert J. Spar
Assistant Examiner—Robert S. Katz
Attorney, Agent, or Firm—M. Paul Hendrickson

[57] ABSTRACT

The present invention provides a stowable, multiple grade ramping device particularly adapted for use in pick-up trucks. The ramping device includes a carrier assembly, an entryway extension unit and a ramp end section for loading and unloading cargo thereupon. The carrier assembly is advantageously equipped with an enclosed trackway having a beveled ramping guide for elevating track following guides mounted onto an entryway extension unit and an open trackway for engaging track following guides mounted onto the ramp end section. The cargo assembly beveled track guides impart an intermediate ramping grade to the entryway unit. The entryway unit is fitted with a pair of enclosed track guides. The ramp end section is equipped with track following guides slideably engaging onto the enclosed entryway track guides which permits the entryway unit and ramp end section to telescopically retract for effective stowage thereof.

11 Claims, 3 Drawing Sheets

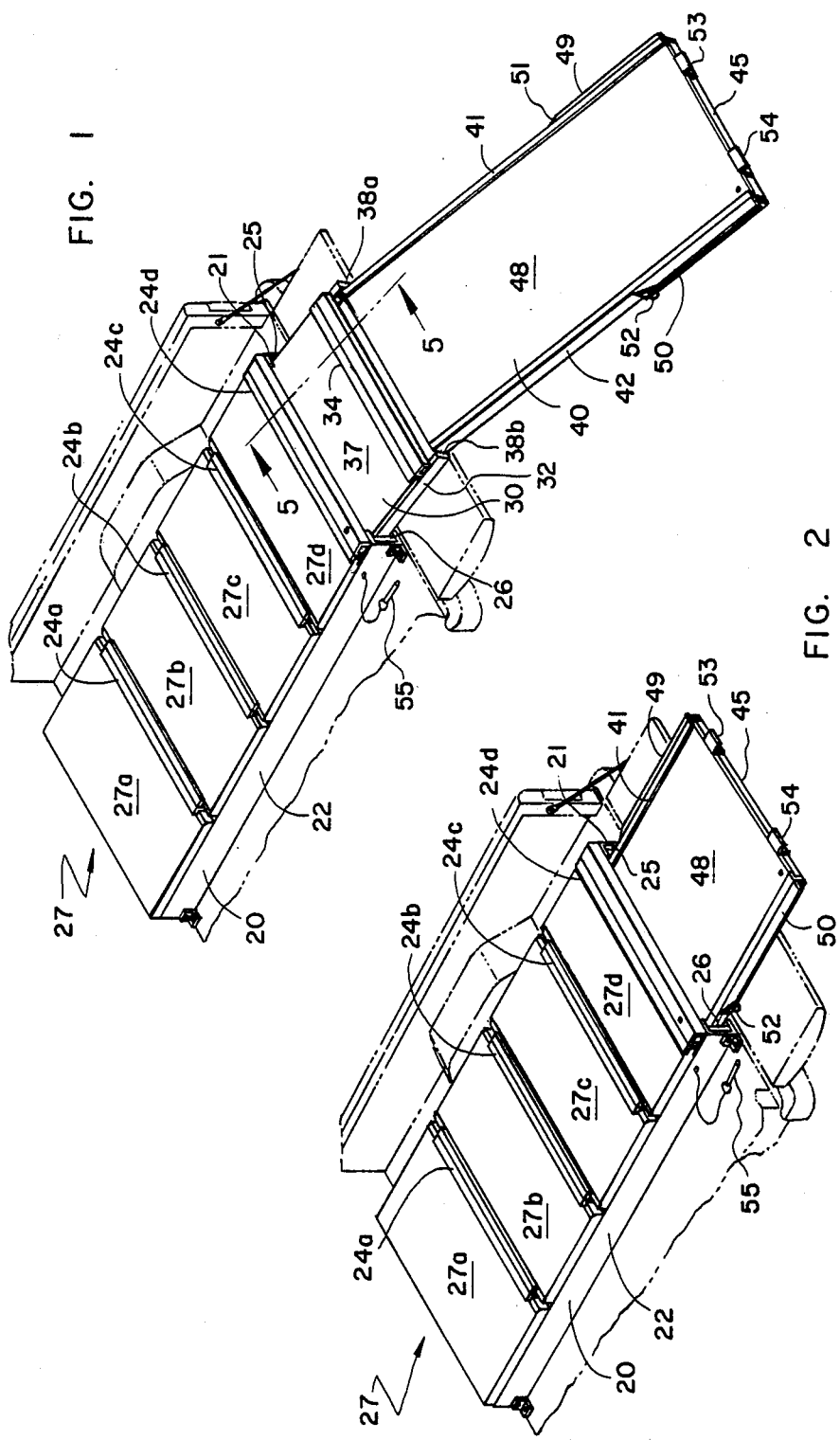

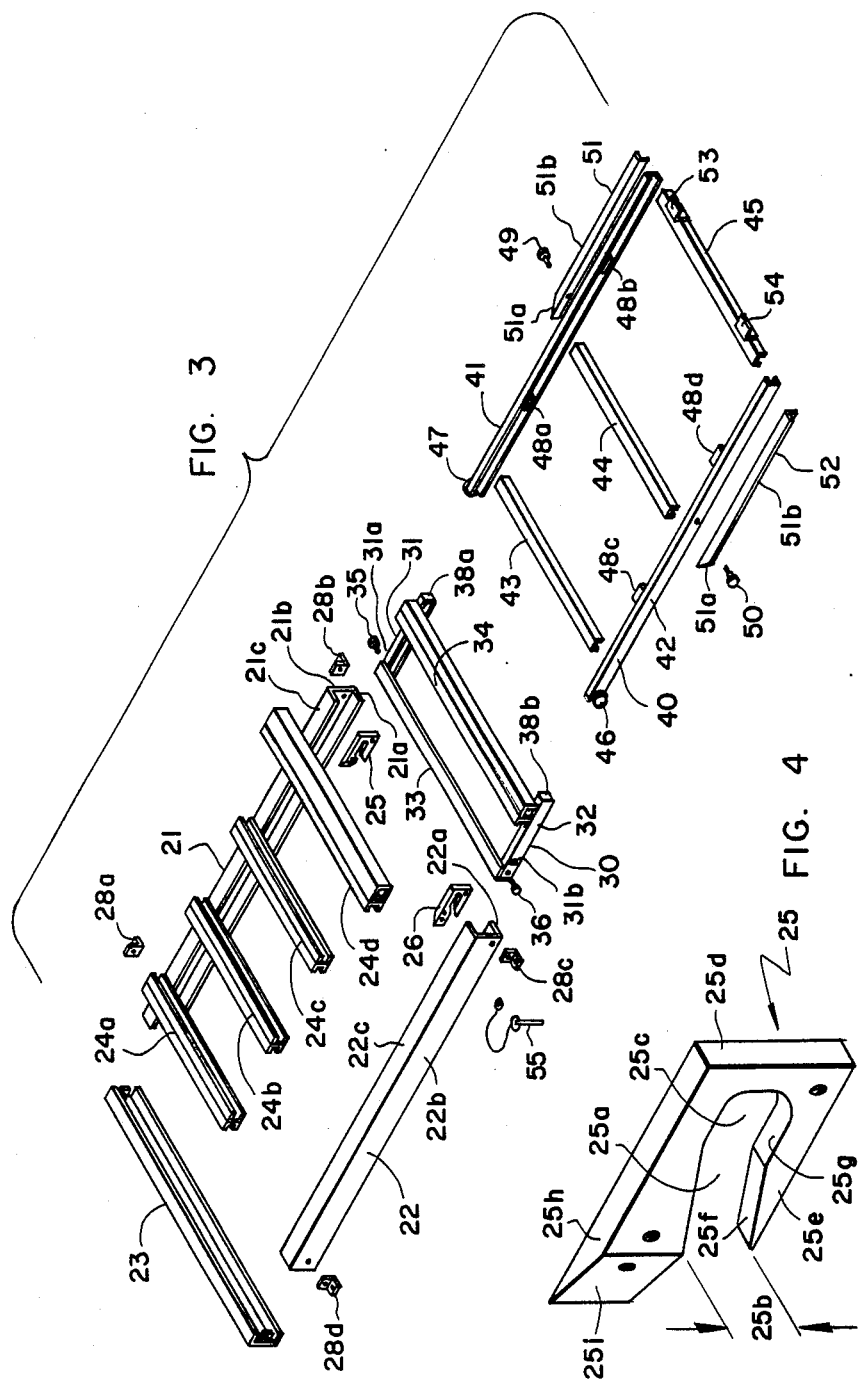

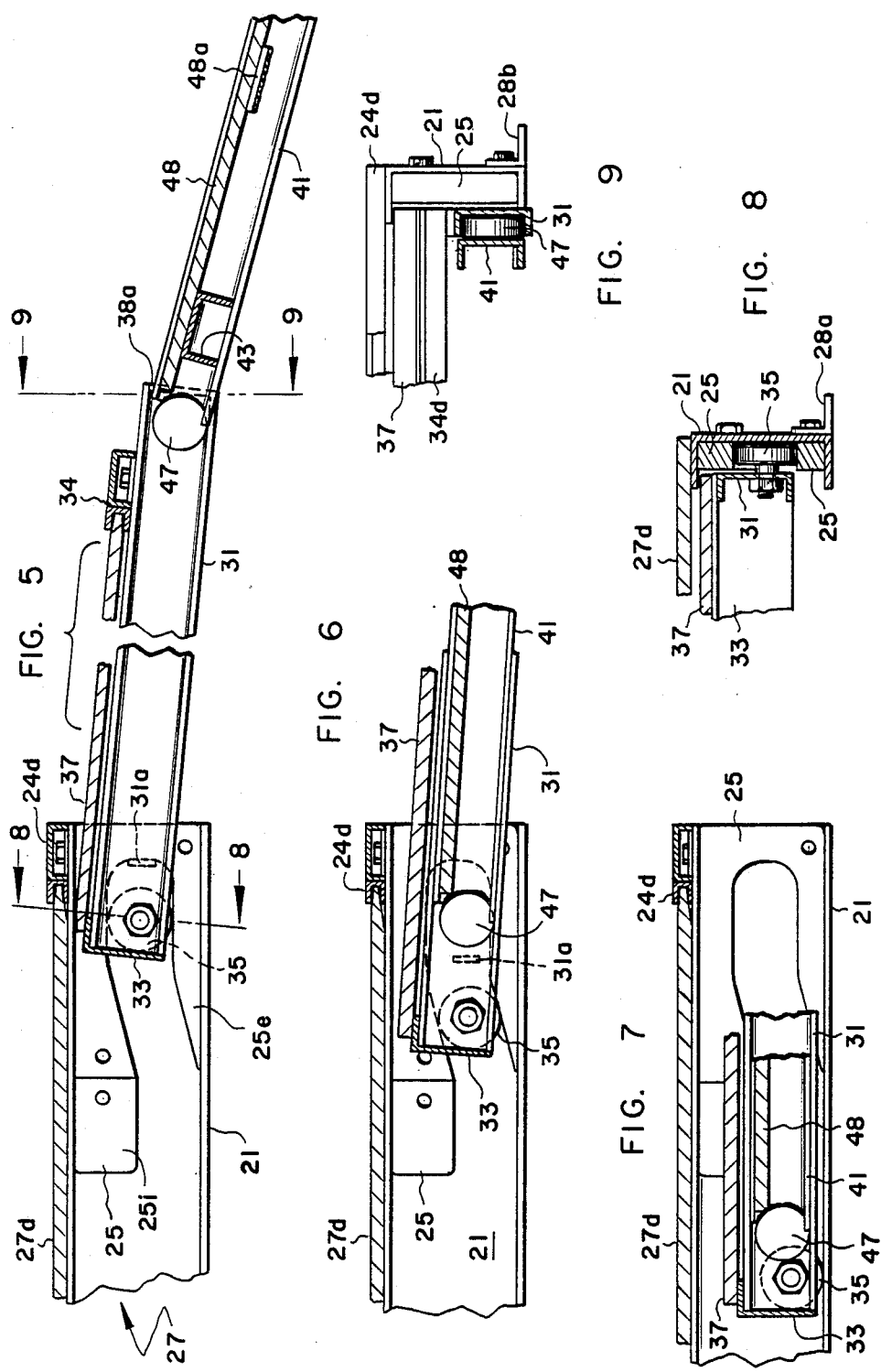

STOWABLE, MULTIPLE GRADE RAMPING DEVICE

BACKGROUND OF THE INVENTION

Telescopically extendable and retractable loading ramps, which are stowable in a cargo bed, have been heretofore used to load and unload cargo from vehicular cargo beds. In U.S. Pat. No. 4,685,857 by Goeser et al., there is disclosed an adjustable load carrying ramp designed to fit within a bed of a vehicle such as a pick-up truck. The Goeser et al. apparatus relies primarily upon a ramp assembly comprised of a base or platform frame assembly which rests upon the vehicular bed and an extendable ramp assembly slidably mounted onto the undercarriage of the platform frame. The ramp assembly is extendable in a sliding manner therefrom to a sloped or ramping surface for rolling objects from ground level onto the load-carrying platform. The Goeser et al. ramping device basically affords two operational planes. One of the operational planes is afforded by the platform frame which rests upon the cargo bed in a substantially parallel and horizontal relationship thereto and the other is a single plane of relatively steep inclination as afforded by the extended ramp assembly.

Another extendable and retractable ramp assembly for use with pick-up trucks is disclosed in U.S. Pat. No. 4,624,619 by Uher. The Uhler assembly generally comprises a main carrier or platform frame for emplacement onto the vehicular bed and a hinged, telescopically extendable and retractable ramp section carried beneath the platform frame. A lateral hinge extends across the entire width of the Uhler ramp section which allows for a portion of the extended ramp section to clear a lowered pick-up tailgate. The Uhler ramping section which extends above the lowered tailgate lies in a parallel and horizontal relationship to the vehicular bed and the platform frame. The hinged ramp section simply serves as a platform frame extension for clearing the lowered bed end gate at which juncture (i.e. at the hinge) a relatively abrupt angular ramping decline is provided for the ramping of cargo thereupon. Uhler relies upon TEFLON strips bolted onto the tailgate inner wall so as to permit the telescoping ramp section to more freely slide into and out of the platform frame undercarriage. The Uhler assembly is similar to the Goeser et al. assembly in that when the ramping device is telescopically extended for loading and unloading it also affords a single inclined ramp or grade for the loading and unloading of cargo thereupon. Except for the relatively steep ramping grades, the Goeser et al. and Uhler assembly may be used in the ramping of a high clearance vehicle but both are generally unfit for ramping of low clearance wheeled vehicles thereupon. This unfitness is generally attributable to the abrupt angular or planar grades which must be negotiated during the ramping use of these devices.

U.S. Pat. No. 4,601,632 by Agee discloses another ramping device for use with pick-up trucks. The Agee device basically comprises an elongated ramp sleeve which fits upon the cargo bed and an extendable hinged ramp access section. Similar to Uhler, the hinging thereof essentially allows the ramping access section to extend the elongated ramp sleeve beyond the lowered end tailgate whereupon the remaining portion of the ramp section forms a relatively steep ramping grade. The loading and unloading of cargo with the Agee device correspondly involves two operational planes, namely the planar ramping grade from ground level to the lateral hinge juncture and the substantially horizontal plane formed by the ramp sleeve and the corresponding tailgate access extension thereto. The Agee device is of a width sufficient to afford a single track trackage thereupon. Consequently, multiple sleeved ramping devices are required to accommodate multiple laterally tracked vehicles such as the conventional three and four wheeled vehicles.

Although extendable and retractable ramping devices for transport upon pick-up trucks and the like have been known for several decades, such devices have failed to incorporate into a single device, the prerequisitial functional, structural and design attributes as required to meet their intended use. Included amongst such prerequisitial attribute wants are: the need for a compact ramping structure which does not sacrifice or detract from the intended ramping cargo carrying capacity or safety of the device, a device which may be inexpensively manufactured, compactly shipped and readily assembled at a distinct location by its users, mechanical soundness in structure, operational use and weight bearing capacity so as to meet the diverse and demanding requirements of its intended use, improvements in mechanical ease of operational use in extending, retracting and stowing of its undercarriage, a device which substantially reduces the hazardous conditions inherently attendant to conventional portable ramping devices, a device effectively reduces over-all ramping span so as to permit its effective use within tight ramping quarters, a device which would permit low clearanced wheeled vehicles (e.g. riding lawnmowers equipped with low clearance mowing decks, motorcycles, etc.) to clear the ramping passageway with equal effectiveness as the high clearanced vehicles clear, a device of a design and capacity to stow more lengthy ramping members within its undercarriage, and a device which effectively reduces the over-all ramping grades so as to substantially reduce slippage, sliding, traction and power requirements, as well as the concomitant ramping hazards during its operational use.

Recognizing such shortcomings and functional deficiencies, the inventor sought to create and develop a compact, portable, retratable, extendable, stowable ramping device embodying these combined functional and desirable attributes heretofore wanting into a single ramping device. The advantages and versatility of the ramping device as afforded by this invention over the prior art ramping device will become more readily apparent from the accompany drawings and following written description of the invention.

SUMMARY OF THE INVENTION

The present invention relates to portable ramping devices and more particularly to a telescopically extendable and retractable ramping device for use in the loading and unloading of cargo from vehicular beds.

BRIEF DESCRIPTION OF THE DRAWINGS

FIG. 1 is an elevational side view of the ramping device of this invention, mounted in a telescopically extended position upon the bed of a pick-up truck for the ramping of cargo thereupon.

FIG. 2 is an elevational side view of the ramping device shown in FIG. 1 depicted in a partially retracted and stowed position.

FIG. 3 illustrates an exploded elevational side view of the dissassembled metallic structural components of the ramping device.

FIG. 4 is an elevational side view of a ramped guide and stop bracket shown in FIG. 3.

FIG. 5 is a sectional view of the ramping device taken along line 5—5 of FIG. 1.

FIG. 6 is a sectional view of the ramping device when positioned in the partially retracted positioned taken along a portion of line 5—5 sectional line section of FIG. 1.

FIG. 7 is a cross-sectional view taken along the sectional view as shown in FIG. 6, except for the positioning of the ramping device in a more retracted position.

FIG. 8 is a rear cross-sectional view taken along line 8—8 of FIG. 5.

FIG. 9 is a rear cross-sectional view taken along line 9—9 of FIG. 5.

DETAILED DESCRIPTION OF THE INVENTION

With reference to FIG. 1, there is shown a ramping device of this invention in the telescopically extended position for the loading and unloading of cargo thereupon mounted upon a cut-away fragmentary view of a conventional pick-up bed. The preferred embodiments of ramping device as illustrated in FIG. 1 generally comprises an elongated carrier assembly (generally designated as 20), an elevated entryway ramping unit (generally designated as 30) and a ramp end section which is generally designated as 40. The elongated carrier assembly 20 serves as a cargo bearing platform and as an undercarriage within which the elevated entryway 30 and the ramp end section 40 are slideably mounted for retraction and stowability within the pick-up bed and telescopic extension of device for the loading and unloading of cargo thereupon. The elevated entryway ramping unit 30 serves as an intermediate ramping grade which in turn permits a reduction in the effective ramp end section ramping grade and the overall angular vectors between ramping planes.

According to the present invention, there is thus provided a retractable and extendable ramping device for use in the loading and unloading cargo onto a vehicle equipped with a cargo bed and a cargo entryway, which comprises an elongated, carrier frame member 20 for emplacement within said bed (e.g. in a lengthwise relationship), an entryway extension unit 30 slideably mounted onto said carrier assembly 20 for extending the cargo entryway access to the carrier assembly 20 (e.g. across the lowered tailgate section of a pick-up truck), a ramp end section 40 slideably engaging onto said entryway unit 30 in a telescopically slideably relationship therebetween so as to permit the extension of the ramping device to a telescopically extended position (e.g. as illustrated in FIG. 1) to provide a ramp passageway for the loading and unloading of cargo thereupon and a retractable position for stowing said device within the carrier assembly 20 and means for elevationally raising the entryway unit 30 in juxtaposition to the carrier assembly 20 to a higher elevational level than the unit 30 in juxtaposition to the ramp end section 40, and thereby providing an extendable ramp device having a plurality of ramping grades wherein the slope differential between the carrier assembly 20, the elevated entryway unit 30 and the ramp end section 40 correspondingly form a gradationally sloped ramping device 10 so as to permit a wheeled cargo of a low clearance to more effectively traverse and clear the ramp passageway as afforded by the ramping device in the telescopically extended position.

As may be observed from FIG. 1, the carrier assembly 20 may suitably longitudinally extend substantially along the entire vehicular bed length and widthwise bridging between the pick-up bed wheel wells to provide a cargo bearing platform covering a major portion (i.e. more than fifty percent) of a vehicular bed surface area. In FIG. 1, the elevated entryway unit 30 is shown as telescopically extending rearwardly and downwardly from the cargo bearing platform of the carrier assembly 20 to the top rail edge of the lowered tailgate at which juncture the ramp end section 40 affords the balance of the ramping grade access to the ground level. It should also be observed from FIG. 1 that the forward platform portion of the entryway ramping unit 30 (i.e. in juxtaposition to the carrier assembly 20) is positioned at a higher elevational level than the rearward platform portion which rests flushly upon the upper inner wall portion of the lowered tailgate (i.e. in juxtaposition to section 40). The telescopically extended entryway unit 30 serves as intermediate ramping grade between the carrier assembly 20 and the ramp end section 40. The embodiments of the ramping device of this invention thus affords for a plurality of ramping planes or grades for the loading and unloading of cargo thereupon. The ability to provide multiple ramping grades within the ramping device herein allows for a substantial reduction in ramping steepness (comparative to conventional devices) while also permitting for a substantial reduction in the effective ramping span length. A comparable ramping grade in a conventional device would require a substantially longer ramping span which would militate against an ability to retract and stow the extendable ramp section within the ramping device. The present device also permits for its use within relatively short or tight ramping quarters. Comparative to conventional ramping devices, the cooperative retractable interrelationship between the elevated unit 30, ramp end section 40 and the carrier assembly 20 herein, as described later in greater detail, also allows for the stowability of substantially longer and more effective ramping sections within the cargo holds of conventional vehicular beds.

The externally viewable components of the FIG. 1 ramping device with reference to the carrier assembly include a left carrier channel guide frame 22, a right carrier channel guide frame 21, a plurality of carrier platform cross-support struts (24a, 24b, 24c and 24d), a plurality of carrier deck panel members (27a, 27b, 27c and 27d) secured onto channels 21 and 22 and supportively disposed between supportive cross-struts 24a, 24b, 24c and 24d to form a carrier platform 27 thereupon. Also shown in FIG. 1 is a pair of left carrier frame angle iron mounting brackets (referenced in FIG. 3 as 28c and 28d) bolted directly onto the left channel 22 and the vehicle bed so as to prevent dislodgment or movement of the ramping device within the bed during its use in the loading and unloading cargo. The right carrier channel guide frame 21 is largely obscured from view except for that portion visible at the right rearward portion of the carrier frame 20 in proximity to the right tailgate section of the pick-up bed. The right main frame channel 21 and the left main frame channel 22 rest in a longitudinal and parallel relationship therebetween and collectively provide suitable trackage (as will be explained in greater detail hereinafter) for the slideably extension or retraction of the elevated unit 30 and ramp section 40 therewithin. The rear portions thereof are provided with a right ramped tracking guide and stop 25 and a left ramped tracking guide and stop 26 nestled against the inner channeled recesses and terminal access ends of guide channels 21 and 22.

The elevated entryway unit 30 is shown as partially nestled within carrier assembly 20 and extending outwardly therefrom to the upper rail edge of the lowered tailgate. The visible elevated entryway extension unit 30 components include a left extension unit track guide 32 fitted with a rear left unit stop 38a and a right extension unit track guide 31 fitted with a rear left unit stop 38b disposed in a substantially parallel relationship therebetween with the forwardmost portions of track guides 31 and 32 being shown as nestled within the right carrier frame channel 21 and the left carrier frame channel 22. Also shown in FIG. 1 is an entryway deck panel 37, and rear cross support strut 34 which form the exposed ramping deck or cargo bearing platform of entryway unit 30. The entryway unit 30 components are externally and internally sized so as to permit its slideably undercarriage and stowage within the confinement of carrier frame 20. The left and right entryway unit support and track guides (31 and 32) afford trackage within which the ramp end section 40 is slideably mounted.

Ramp end section 40 is shown in FIG. 1 as slideably disposed within the elevated entryway unit 30. The visible components associated with the ramp end section 40 of FIG. 1 include a right ramp end support beam 41, a left ramp end support beam 42, a rear cross support beam 45, and a ramp end panel section 48. The right support beam 41 is provided with a rear right ramp track following guide 49 and a right guide bar 51 along the outer rear margin of section 40. The left support beam 42 is correspondly fitted with a rear left guide bar 52 and a rear ramp track following guide 50. The illustrated guide bars 51 and 52 are of an angle iron construction in which one of the flanges includes a beveled or tapered nose shaped projection with the other flanged outer surface serving as a mounting plane for securing the guide bars onto the respective support beams 41 and 42. The leading edges of the beveled projection portion of guide bars 51 and 52 are shown as positioned in front of the rear ramp track following guides 49 and 50. The rear ramp track following guides 49 and 50 are adapted upon sufficient retraction of ramp end section 30 into the carrier assembly 20 to follow along the outer flanged rim portion of bottom channel rails 21 and 22. The rear ramp following guides 49 and 50 in the ramping device are designed to clear the inner rail positioned ramped guide and stop brackets 25 and 26.

In operational use and retraction of unit 30 and section 40 within carrier assembly 20, the guide bars 51 and 52 serve as a means for longitudinally centering the rear ramp end section 40 so that the rear ramp end following guides 49 and 50 are positioned in proper longitudinal alignment for trackage upon the corresponding bottom channel rails (referenced as 21a and 22b). Upon sufficient retraction of ramp end section 40, the beveled flanged portions 51a and 52a of guide bars 51 and 52 will come in contact with the elevating guides stops 25 and 26. The rear ramp end track following guides 49 and 50 are laterally positioned for corresponding alignment onto the outer rail portions of bottom rails 21a and 22a. If the ramp end section 40 is not properly centered, the beveled 51a and linear 51b portions of bar 51 and the mirror imaged guide bar 52 will appropriately center section 40 upon contact with guide and stops 25 and 26 so that the rearwardly positioned rear ramp section track followers 49 and 50 will align and ride upon outer rimmed portion of the corresponding carrier bottom rails 21a and 22a. Although the guide bars 51 and 52, rear and track following guides 49 and 50 may be eliminated, the inclusion of these components facilitates the ease whereby the ramp end section may be extended, retracted, stowed and supported by carrier assembly 20. The guide bars 51 and 52 in combination with the corresponding rear track following guides 49 and 50 afford a means for providing multiple trackage upon each of the single railed track guides 21 and 22 within the track guides.

Also illustrated in FIG. 1 are handle supports 53 and 54 which may be optionally used for suspending or withdrawing the ramp section from the carrier assembly 20. A carrying locking assembly 55 comprised of a 3/8" O.D. by six inch clevis pin 56 and correspondingly drilled mating apertures within the carrier assembly 20 and ramp end section 30 for retaining the device in the stowed position with an attached cable and cable mount for ready accessibility is shown as a preferred, but optional, accessory thereto.

The carrier assembly deck paneling sections (27a, 27b, 27c and 27d) in conjunction with the cross support carrier assembly struts (24a, 24b, 24c and 24d) form the carrier cargo bearing platform 27 or deck for the carrier assembly 20. The carrier paneling sections may be fabricated from a variety of materials possessing sufficient structural strength to bear the intended cargo; such as wood, plywood paneling (e.g. outdoor or marine grade plywood ¼ or 1 inch or more in thickness), metal (e.g. steel, iron, aluminum, etc.) sheets, diamond plates, expanded plate metals, etc., high strength thermoplastic or thermoset composites, mixtures thereof and the like. The carrier paneling sections (27a, 27b, 27c and 27d) are advantageously of sufficient length to be securely affixed to carrier channels 21 and 22 by conventional means so as to contribute strength to the carrier assembly and maintenance of channels 21 and 22 in the proper trackage alignment. The ramping entryway unit paneling section 37 and ramp end section paneling section 48 also respectively serve as the cargo bearing platform or decking for ramp end section 40 and unit 30. These paneling sections may be appropriately fabricated from the same materials used for the carrier platform paneling sections. These paneling sections (i.e. 37 and 48) are likewise advantageously of sufficient length to bridge and impart further structural strength to the entryway unit 30 and ramp end section 40.

In the FIG. 2 view, extension unit 30 (occluded from view) has been partially retracted within carriage assembly 20 by forwardly biasing of the leading ramp section track following guides (not shown) against forward entryway unit stops (not shown) causing the entryway track following guide (not shown) to be forced within the trackway as afforded by the right and left channels 21 and 22 of carrier assembly 20 as will be described in greater detail hereinafter.

The internal components of the ramping device 10 and operational interrelationship therebetween in providing the multiple tiered or grade ramping device may be more fully appreciated by referring to FIG. 3 which depicts a side and exploded view of its disassembled metallic components. The components rigidly affixed onto the elongated carrier assembly 20 shown therein include a right carrier frame channel guide 21 and a left main frame channel guide 22 (preferably of a channel steel or iron construction) which form the basic supportive structure and trackage for the slideably mounted unit 30 and ramp end section 40. The recessed channel of right channel guide 21 as defined by the right lower tracking rail 21a, a right channel side wall 21b and a right top channel rail 21c and the corresponding interfacing left carrier tracking guide of channel 22 formed by a left lower tracking rail 22a, a left channel side wall 22b and a left channel top rail 22c to provide an appropriate trackage and undercarriage mount for extension unit 30 and ramp end section 40. The left carrier channel 22 and the right carrier channel 21 are longitudinally disposed in a substantially parallel relationship to one another so as to correspondingly register and provide suitable trackage for track following guides therewithin. The left carrier channel 22 and right carrier channel 21 guides are structurally braced in a parallel relationship at the forward end by a front carrier brace 23 and at the other longitudinal end or rearward access end by a rear carrier brace 24d. The carrier decking panel sections 27a, 27b, 27c and 27d (shown in FIG. 1, but not shown in FIG. 3) advantageously bridge channels 21 and 22 and securely affixed thereupon for purposes of strengthening the carrier assembly deck 27 and to maintain channels 21 and 22 in the appropriate trackage alignment. In addition, carrier cross-support struts 24a, 24b and 24c are intermittently disposed along decking 27 for purposes of structurally reinforcing the weight bearing capacity of carrier deck 27 including the decking panel sections (i.e. 27a, 27b, 27c and 27d) thereof. The carrier cross-support struts 24a, 24b and 24c may be of an I-beam construction of sufficient size and strength to enhance the carrier deck or platform 27 weight bearing capacity while also affording a recessed groove for corresponding registration to the paneling thickness of sections 27a, 27b, 27c, and 27d. The I-beam struts 24a, 24b and 24c may also be, if desired, cut to a sufficient bridging length so as to be bolted, welded or otherwise securely fastened onto right channel 21 and left channel 22. The rearward portion of the elongated carrier assembly 20 is shown as being associated with a pair of ramped guide and stop brackets 25 and 26. The right ramped stop bracket 25 and the left ramped stop bracket 26 are respectively securely fastened onto the recessed channel portions of the left carrier frame channel track guide 22 and the right carrier frame channel track guide 21. The ramped guide and stop brackets 25 and 26 are advantageously dimensionally sized so as to provide an upwardly and vertical adjustment in trackage within carrier assembly 20 as more fully described in reference to FIGS. 4–8 hereinafter.

FIG. 3 reveals components of the elevated entryway unit 30 including a right entryway track guide 31 and a left entryway track guide 32 positioned apart in a substantially parallel relationship by a front cross frame 33, a rear cross and panel support frame 34. The right entry guide 31 and left entry guide 32 as depicted as fitted with a pair of forwardly positioned track following guides (shown in FIG. 3 as a right guide extension roller 35 and a left extension guide roller 36) which respectively correspondingly register and provide tracking for the entryway extension unit 30 within the longitudinally aligned recessed channels of right main frame channel guides 21 and the left main frame channel guide 22 as well as the corresponding right beveled cam guide and stop 25 and left beveled cam guide and stop 26 thereof.

The right entryway track guide 31 and the left entryway track guide 32 may likewise by of a channel iron construction (sized to allow for stowage within the carrier assembly 20) to provide internally disposed channeled recesses therewithin to correspondly serve as tracking guides for the leading track following guides (46 and 47) of ramp end section 40. The rearward end of the left track guide 32 and right entryway track guide 31 are respectively equipped with a left rear entryway stop 38b and a right rear stop 38b which collectively serve as track stops for the corresponding leading track followers 46 and 47 of the ramp end section 40. An entryway extension end frame 33 extending downwardly from the forwardmost end of extension tracks 31 and 32 may serve as a common forward stop to limit further forward movement of leading ramp section track followers 46 and 47 therewithin. As will be observed from FIGS. 1 and 2, the crosswise width of extension unit 30 (as defined by the outer side walls of right track guide 31 and left track guide 32 in cooperative association with projecting left track roller 36 and right track roller 35) is sized so as to enable the extension unit 30 to freely traverse within the tracking pathway of elongated carrier frame 20.

The ramp end section 40 as shown in FIG. 3 includes a right ramp rail support member 41, a left rail support member 42, a plurality of recessed ramp crosswise struts (front strut 43, mid-strut 44 and rear strut 45) which supportively contribute structural strength and maintain the left and right rail support members (41 and 42) in parallel alignment. If desired, the paneling section 48 of the ramp end section 40 may be further supportively buttressed with recessed bracing tabs 48a, 48b, 48c and 48d. The ramp end section 40 is suitably provided with at least one pair of oppositely positioned leading track following guides shown in FIG. 3 as a left ramp end studded following guide 46 and right ramp end studded following guide 47. The leading studded track following guides 46 and 47 may be appropriately provided in a cylindrical shape so as to slideably engage and match the recessed channel trackage afforded by the right extension track guide 31 and left extension track guide 32. The leading studded following guides are positioned onto the forward terminal end of member 41 and 42 and preferably with at least a portion of the following guides 46 and 47 protruding outwardly therefrom as illustrated in FIGS. 3 and 5. The paired leading track followers 46 and 47 of the ramp end section 40 are advantageously limited to trackage as afforded by the extension unit channel guides 31 and 33, stops (e.g. forward bolt stop 38a and 38b) of elevated extension unit 30. The leading studded track following guides 46 and 47 when provided in a fixed stationary form with proper lubrication, will move smoothly and easily within the channels of channel guides 31 and 32 while also providing, in comparison to roller guide followers, a more durable and reliable track following guide combination. The ramp end section 40 is appropriately sized so as to provide the proper ramping grade, stowability within the carrier frame 20, telescopic extension and retraction within the channeled recesses of right extension unit track guide 31 and left extension unit track guide 32. The width of ramp end section 40 including its leading ramp following guides 46 and 47 may be appropriately matched to register onto the trackage pathway of extension unit 30 and to permit the ramp end section 40 to uniformly and longitudinally traverse the carrier assembly 20 trackage during its telescopic usage.

In the preferred embodiments of the invention (as shown in the Figures) the ramp end section is also advantageously equipped with a pair of laterally disposed rear track following guides 49 and 50 (preferably both of a roller bearing construction) which are positioned in correspondly longitudinal alignment so as to correspondly register onto and ride upon the outer rail portions of bottom channel rail guide 21a and bottom channel rail guide 22a. The illustrated ramp guide and stop brackets 25 and 26 respectively occupy approximately the inner half rail portion of channel rail guides 21a and 22a. The rear track following guides 49 and 50 are positionally mounted onto the ramped end section 40 so as to provide trackage upon the outer rail portion of channels 21a and 22b with sufficient clearance to permit track following guides 49 and 50 to laterally clear the ramped guide and stop brackets 25 and 26. As previously mentioned, the cooperative association of the right guide bar 51 and the left bar 52 with brackets 25 and 26 effectively affords proper alignment and trackage of track following guides 49 and 50 onto channel guide rails 21a and 22b. As will be observed, guide bars 51 and 52 are respectively provided with beveled portion 51a and 52a, and unbeveled or linear portion 51b and 52b. The beveled portions upon retraction will biasingly center the ramp end section 40 while the remaining straight edged portions thereto will maintain section 40 in a centrally disposed position for proper trackage by track following guides 49 and 50. The roller track following guides 49 and 50 are advantageously laterally positioned along the left rail support member 42 and right rail support member 41 in a centrally disposed location so as to facilitate slideable engagement of the ramp end section 40 within carrier frame 20 and to provide additional support thereto when stowed.

FIG. 4 portrays in greater detail, the right beveled track following guide and stop 25 of which the laterally positioned left beveled track guide and stop 26 is a mirror image. The left slotted beveled track guide and stop 26 and the right slotted beveled track guide and stop 25 serve to provide the multiple tiered ramping device of this invention. As will be observed, the right beveled track and guide stop 25 rests substantially flushly upon the upper rail surface of right bottom rail 21a (as further depicted in FIGS. 5-7) and against the inner right side wall 21b of the right carrier channel guide 21. The rear side edge of track guide and stop 25 is cornered at about the right channel guide 21 rail ends to form a terminal tracking stop therefore. Elevating guide and stop 25 occupies approximately hald (inner half) of the right bottom rail 21a with the remaining portion thereof available for supplemental trackage thereupon. The left slotted beveled track guide and stop 26 is likewise correspondingly flushly positioned onto the channel recess afforded by the railed surface of right bottom rail 22a and left inner side wall 22b guide of left carrier guide channel 22.

The right beveled track guide and stop 25 shown in FIG. 4 is of unitary construction and generally comprises a diagonal slotted aperture or guide slot (generally designated as 25a) for elevationally raising and stopping a track following guide (e.g. guide follower 35) and having an open slot aperture 25b at one end for entry of a track following guide 35 and an aperture restriction 25c at the terminating end of the slotted aperture 25a; a vertically disposed cross wall base section 25d bordering onto and forming an aperture restriction 25c, a projecting guide section 25e bordering onto the lower margin of the slotted aperture 25a and longitudinally extending outwardly from the base section 25d and forming in combination with said slotted aperture 25a a beveled and plateaued track guide facing for elevationally raising a track following guide therewithin, and advantageously a projecting section 25h bordering onto the upper margin of slotted aperture 25a and projecting outwardly from said base section 25d, with said projecting section being positioned sufficiently apart from the beveled and plateaued track guide to permit a track following guide to traverse therewithin.

Referring to FIG. 4 with greater specificity, the elongated slotted track guide 25 which affords an internally disposed track guide for trackage thereupon by a track following guide comprises a horizontally extending guide slot 25a which affords passageway for a track following guide therein with said guide slot 25a having an access opening 25b for receiving a track following guide therewithin at one end of the guide slot 25a and a slotted restriction or stop 25c to restrict passageway of a track following guide therein positioned at the other end of guide slot 25a passageway, a vertically disposed cross wall 25d bordering onto the slotted restriction 25c, a horizontally disposed projecting guide leg 25e bordering onto the lower margin of guide slot 25a with said guide leg having a beveled track guide section 25f for elevating a track following guide interfacing onto said beveled section 25f and a plateaued track guide section 25g positioned in a substantially parallel and a horizontally elevational relationship to track rail guide 21a, and a track guide retaining leg 25h projecting outwardly from said cross wall 25d with said guide retaining leg 25h bordering onto the upper margin of said guide slot 25a so as to permit a track following guide disposed within said guide slot 25a to interfacially traverse the beveled section 25f and the plateaued section of said slotted guide 25.

Guide stops 25 and 26 in conjunction with the corresponding track following guides provide a suitable means for elevationally raising the extension unit 30 to a higher elevational level in juxtaposition to the carrier frame section 20 than that portion of extension unit in juxtaposition to the ramp end section 40. This effectively provides an intermediate ramping grade between the carrier frame section 20 and ramp end section 40 and allows for an over-all reduction in the ramping section 40 ramping grade. This also effectively reduces the abrupt angular changes or ramping ridges which conventionally occur at the platform plane and the ramping plane vector. A relatively small elevational rise (e.g. ¼" or more, advantageously from about ½" to about 2" or more and preferably from about ¾" to about 1½") will reflect in a measureable ramping grade in unit 30. In general, the ramping grade as afforded by the elevated unit 30 will range from about one degree to about ten degrees, advantageously less than about eight degrees (e.g. about 2 degrees to about 8 degrees) and preferably from about 3 degrees to about 6 degrees with the specifically illustrated device herein having about a 3 degree ramping grade in the fully extended position on a standard sized pick-up bed equipped with a standard lower tailgate position in horizontal alignment to pick-up bed platform. Thus, the one inch elevational rise as provided by the beveled guide and stop brackets 25 and 26 herein effectuates a three degree ramping slope. The ramp end section ramping grade will generally range from about 10 degrees to about 20 degrees, advantageously from about 12 degrees to about 18 degrees and preferably from about 13 degrees to about 17 degrees with the illustrated ramp end section providing about a 16 degree ramping slope.

By viewing the trackway thus afforded by the recessed channel of the right channel 21 in conjunction with the slotted guide and stop bracket 25 (as illustrated in FIGS. 5–7), it will be observed that an appropriate track following guide such as a roller or studded track following guide 35 therewithin upon telescopic extension will longitudinally follow the substantially flat trackage as afforded by right bottom rail 21a until the track following guide 35 reaches the leading ramped inclining edge of beveled track guide section 25f at which point the track following guide 35 will commence trackage upon the ramped incline thereof. The guide follower 35 will continue to elevationally rise along the interfacing beveled contour of section 25f and then proceed along the horizontally disposed interfacing trackage of the plateaued track guide section 25g until the proceeding track stop guard 31a (a centrally disposed bar projection externally welded onto the outer right entryway channel guide by a ⅛″ margin) ultimately rests onto the slotted end stop 25c which prevents any further extension of unit 30 therefrom. The enclosure formed by right slotted beveled guide and stop 25 at the terminating access end of channel 21 functions in elevating tracking passageway and stop for a following guide 35 such as a stationary studded following guide or rotating or wheeled roller therein when the ramping device is slideably extended. The trackage as afforded by the left channel 22 in conjunction with the left beveled track guide and stop 26 is likewise adapted to receive, guide and stop correspondly oppositely positioned guide follower 36 therewithin. The ramped stop brackets 25 and 26 in combination with the corresponding track following guides 35 and 36 thus afford a means for elevationally raising the extension unit 30 in juxtaposition to the carrier frame section 20 to a higher elevational level than the extension unit 20 in juxtaposition to said ramp end section 40.

The guide followers 35 and 36 of unit 30 for trackageway within the carrier channel guides 21 and 22 are also advantageously paired and laterally positioned opposite from each other along a linear axis perpendicular to the longitudinal axis formed by channels 21 and 22 so as to concurrently move laterally along the longitudinal axis of the carrier frame 20. Thus, at any given extended or retracted position the paired track following guides 35 and 36 will be laterally aligned with another in a substantially traverse, parallel and perpendicular relationship to major planar axis of the carrier frame 20. The lateral pairing of the track followers in this manner restricts the extension unit and ramp section from excessive sidewise, upward or downward movement within the trackage.

The ramped guide and stop 25 shown in FIG. 4 also includes an additional component which facilitates the multiple track guide attributes of bottom channel rail guide 21a with the left ramped guide and stop 26 fulfilling a correspondingly function upon bottom channel rail guide 21b. This preferred embodiment of the invention as illustrated in FIG. 4 entails a track aligning guide section 25i projecting outwardly from track guide retaining leg 25h which serves as a means for positioning the right track extension following guide 35 in vertical alignment with the beveled and plateaued trackage of track guide and stop 25. As shown in FIG. 4, the track guide retaining leg 25h projects further into channel 21 than does guide leg 25e and access guide slot opening 25b. The track aligning guide section 25i may be provided in the form of a tapered or beveled nose section 25i which in relationship to the slot guide opening and channel side wall 21b is beveled inwardly towards the inner channeled surface of recessed channel wall 21b so as to form a substantially smooth contoured surface therebetween. When the ramp section 40 and extension unit 30 are telescopically extended, the beveled or tapered projecting section 25i is designed to interfacially contact upon the leading edge of right extension unit channel 31. If channel 31 is too closely aligned to the right side wall 21b, the tapered nose section 25i will center unit 30 for proper trackage. Thus, as the extension unit 30 is further withdrawn from the carrier frame 20 undercarriage, the beveled or tapered aligning guide nose section 25i will biasely force the right extension channel 31 to a more centrally disposed position so that track following guide 35 will then be positioned in appropriate vertical alignment for tracking upon the beveled 25f and plateaued 25g tracking guide of guide and stop 25. As mentioned previously, the right bottom rail 21a and left bottom rail 22a are sufficient in width to provide trackage along the inner rail margin for track followers 35 and 36 as well as along the outer rail margins thereof for ramp section guide followers 49 and 50. Thus, the track followers 35 and 36 are correspondly designed for trackage along the inner rail portions of bottom rails 21a and 22b (i.e. in juxtaposition to side walls 21a and 22b) and the correspondingly tracking of guides and stops (25 and 26) while track followers 49 and 50 of ramp end section 40 are laterally spaced so as to respectively ride upon the outer railed portions of channel bottom rails 21 and 22 and to clear the trackage area occupied by ramped guide and stop brackets 25 and 26.

With specific reference to the preferred embodiments of the ramping device illustrated in the drawings, the following mentioned materials were used in its construction:

The left and right carrier assembly channel guides (21 and 22) were each constructed of 16 gauge stamped channel steel measuring (I.D.) 4 inches high and 2 inches wide cut to 94 inches in length. The front carrier brace 23 was fabricated from 16 gauge stamped channel steel 4 inches in height, flanged to 2 inches in width and 48 inches in length) with the terminal channel ends being provided with a 2 inch by 3 inch flanged lip perpendicularly projecting outwardly from the recessed channel base and fitted with a centrally disposed 5/16 inch bolt hole for the bolting (¾ inch long×5/16 diameter machine bolt and nut) of brace 23 onto the correspondent channel support guides 21 and 22 which are likewise provided with registering 5/16 inch diameter bolt hole therefore. The carrier front brace 23, measuring 4″×2″×48″ was fabricated from stamped 16 gauge channel steel with each channel end having a 2″×3½″ lip end which vertically extends outwardly from the recessed channel base and aligned with the cut flanged ends to form an enclosure thereto and a bolt hole for registration onto the corresponding side walls 21a and 22 bolt holes as illustrated.

The rear carrier cross support brace 24d was constructed of an ⅛ inch thick channel iron (measuring 2″×1″ O.D. and 48″ in length) fitted with two ⅛″ thick flat iron cross brace mounts (measuring 1″×1¾″) flushly cornered onto and welded onto the terminal ends of the channel iron top rails to provide a pair of mounting cross braces in parrallel and longitudinal alignment with the channel iron top rail edges. The cross brace mounts were provided with a centrally disposed 5/16 inch bolt hole and registering a 5/16 inch I.D. nut welded onto inner brace mount surface (i.e. beneath the mount facing toward the recessed channel) for securing brace 24d onto the respective top rails 21c and 22c of channels 21 and 22. A 48 inch channel iron strip (1 inch×¾ inch×⅛ inch thick) was welded one of the outer flanged surfaces in channel back to side flange relationship with the outwardly extending channel flanges providing a recessed channel for supporting panel sections 27d.

Each of the carrier assembly cross support struts 24a, 24b and 24d consisted of two channel irons measuring ⅛" thick, flanged to 1" height by 1½" width and 44" in length welded together in a back-to-back relationship to provide an I-beam support strut with outwardly and oppositely disposed paired flanges affording a channeled recess for receipt of the panel sections therewithin. The plywood (exterior grade) paneling sections 27a, 27b, 27c and 27d which measure 48"×22½" and ¾" thickness were symetrically beveled cut to ⅝" leading cross-wise edge by a ¾" margin to facilitate insertion and flush wedging of the panel section within the corresponding interfacing recessed channels of struts 24a, 24b, 24c and 24d.

The main carrier assembly brackets (28a, 28b, 28c and 28d) were fabricated from ⅛" thick angle iron and of 1½" square flanges each of which was provided with a centrally disposed 5/16 inch I.D. slotted hole for bolting the vertically extending flange portion onto the correspondingly channel guides and the horizontally extending flange onto the vehicular platform deck.

Each of the elevated extension unit channel guides 31 and 32 were fabricated from channel iron sections measuring ⅛"×2"×1" cut to a 27" length with one end of each channel guide having a 1"×2" lip vertically extending upwardly from the channel base and in alignment with the cut flange edges to form a recessed channel enclosure (stops 38a and 38b). The forward portion of each section guide (31 and 32) is fitted with a 5/16" bolt receiving hole centrally disposed within the channel base sidewall at a one inch margin removed from the forward terminating edge guides.

The right and left entryway track guides (31 and 32) were each fitted with a centrally disposed welded stop plate (¾"×¼"×3/16" thick) positioned 2½ inches removed from leading or forward ends of the channel iron to form stops 31a and 32b.

The extending unit plywood panel section 37 was of the same construction as paneling sections 27a, 27b, 27c and 27d except it measured 46"×24" with only one lengthwise edge beveled and the other straight cut. The ramp end platform panel 48 was of the same construction as the panel sections straight cut to a 43¾"×91" size for insertion into the recessed ramp end section 40 supportive structures.

The rear cross section 34 was constructed in the same manner as rear carrier support brace with the exception that the 2"×1"×⅛" channel iron section was cut to a length of 46".

The right and left ramp rail support members (41 and 42) were constructed of 2"×1"×⅛" channel steel, 92" in length. The ramp deck following guides 46 and 47 were cut from 1¼" steel rod stock to a ¾" width and welded onto the channel back facing at a centrally disposed position leaving about a ⅝" overhang or projecting portion therefrom.

Standard stock (1000 pound capacity) case hardened ball bearing (13 ball type) rollers fitted with a shoulder and stud were used to provide the left and right extension unit track following guides (35 and 36) and the left and right ramp section followers 49 and 50. The roller bearings were 1¼" O.D. with a ½" facing (matching the guide and stops 25 and 26 track facing), a ¾" long ×5/16 " machine threaded bolt stud shouldered ¼" from the bearing facing. The roller bearings were also equipped with a screwdriver slot to hold the stud bolt in place when bolted unit 30 and section 40.

The four ramp end bracing tabs 48a, 48b, 48c and 48d were constructed of ⅛"×1"×1" angle iron cut to a 3" and welded onto inner sidewalls of support members 41 and 42 midway between the cross supports therefore at a recessed ¾" margin therewithin so as to correspondly register to ¾" panel thickness.

The recessed ramp end cross-wise struts (43, 44 and 45) were fabricated ⅛"×2"×1" channel iron cut to a 43¾" length with a welded ⅛" face plate flushly aligned to channel cuts, fitted with a 5/16" bore and welded nut thereto welded onto each of the cross plates. Handles 53 and 54 were directly welded to strut 45.

The right and left guide bars (51 and 52) were made from 20 gauge angle steel (1¼"×1¼") with rolled outer edges cut to 48" in length with one flange end being cross cut at 45 degrees and the other flange being provided with registering bolt holes for mounting onto the correspondent ramp end cross-wise struts 44 and 45 and ramp support members 41 and 42. The guide bars 51 and 52 are designed to provide a total ⅛" lateral tolerance between the ramped guide and stops 25 and 26.

With reference to FIG. 4, the ramped guides were of a cast iron construction (generally outlining a rectangular configuration with a rear flat surface) measuring 3" in width across cross-wall 25d, 7" in length across the upper margin of track guide retaining leg 25h, with the unbeveled portion thereof measuring 5½" and a tapering nose section extending therefrom for another 2" to a terminal ⅛" thick edge, 5" across the bottom margin to form the projecting guide section 25e terminated by ⅛" thick leading edge, a beveled incline measuring 2½" in length at about 15 degree incline (25f) to provide a ¾" elevational rise between the lower and top margin of projecting guide section 25e with about 2" plateaued track section 25g following thereafter as measured from the end of the beveled section to the terminating end of the guided slot 25a. The guide slot 25a along its entire slot length measures about 1⅜" in height. The ramped guide and stop is 25c provided with three machine bolt threaded apertures for corresponding registration to bolt holes in sidewall channels 21b and 22b for securely mounting at an appropriate position for trackage. The ½" thick ramped guide and stop 25 correspondly matches the facing of roller bearing 35 and 36.

In assembling the ramping device, ¾"×5/16" O.D. bolts are generally used to assemble the prefabricated components together by registering the corresponding bolting apertures as illustrated in FIG. 3. The respective track following guides are inserted within the appropriate tracking guides before the securance of the corresponding track stops thereto.

The section view of FIG. 5 shows the manner in which the right main channel frame 21, the right bracket guide and stop 25, the carrier deck panel 27d and the rear supportive brace 24d of carrier assembly 20 are mounted together. The corresponding left carrier assembly counterparts are a mirror image. It also depicts the right entryway guide 31 with right track followers 35 and track stop 31a projecting into the internal recess of guide slot 25a in a stopped position therewithin, the entryway extension end frame 33 (spaced at a sufficient distance from the supportive cross brace 24d to reduce the extent of ridging therebetween) in assembled combination with entryway deck panel 37 and rear cross strut form a cargo bearing platform therefore, the entryway guide channel formed by the bottom rail of channel 31 in conjunction with right unit end stop 38a and forwardly disposed bolt and nut combination which functions as a forward stop therewith for right leading ramp track following guide 47.

The fragmentary sectional view of the ramp end section therein shows the right leading track following guide resting (in the fully extended position) against stop 38a and within the restricted trackageway of unit 30, front and mid struts 43 and recessed bracing tab 48a with the rear ramp paneling being supported thereupon.

The sectional view of FIG. 6 is a partial view taken along the same planar view of FIG. 5 and shows the cooperative interrelationship between the rearward portion of the carrier assembly 20 and entryway unit 30 components (bearing the same numerical designation) when the entryway unit components are slightly retracted into the carrier assembly 20. By comparing the ghost line outlining the roller bearing track following guide 35, guide 35 is shown as descending a portion of the beveled guide section 25f as opposed to its positioning uon the plateaued track guide section 25g in FIG. 5.

FIG. 7 is likewise taken along the same sectional plane view of FIG. 5 with the illustrated forward section of entryway unit 30 being shown as being further retracted into the carrier assembly with the track following guide 35 as illustrated by the ghost lines therein following the trackway of the right bottom rail guide 21a.

The sectional view of FIG. 8 is taken along line 8—8 of FIG. 5. This cross-sectional view depicts the track following guide 35 interfacially resting within slotted aperture 25a and upon the track guide surface of plateaued guide section 25 at about a ¾" vertical rise from the track guide of channel bottom rail 21a and a total of about 1 inch elevational rise above the cargo bed platform.

FIG. 9 is a sectional view taken along line 9—9 of FIG. 5 which shows in further detail the telescopic interrelationship between the entryway extension unit 30 and the ramp end 40 in the extended position. The leading right track following guide 47 illustrated as resting within the interfacing enclosed trackway or tracking guide of the right track guide 31 with the ramp end section 40 fully extended.

The ramping device herein in its preferred embodiments includes a plurality of slideably extendable ramp sections having at least two concentric and paired longitudinally extending track guides in parallel relationship to one another with at least two of the paired tracking guide defining an enclosed trackway for a track following guide disposed therewithin and at least two paired track following guides positioned in lateral and longitudinal alignment so that each tracking guide is provided with at least one track following guide in a slideable relationship therebetween.

In the preferred embodiments, the cargo assembly 20 is provided with a pair of parallel and longitudinally tracking guides defining an enclosed trackage for a pair of registering tracked following guides therewithin, the entryway unit 30 is provided with a mounted pair of track following guides slideably registering and engaging onto the enclosed trackage of the carrier assembly, the entryway unit includes a pair of parallel entryway tracking guides laterally and longitudinally disposed between the paired cargo assembly tracking guides and defining an enclosed trackway therewithin, and a pair of registering, ramp end section track following guides slideably engaging onto the entryway unit tracking guides. In a further preferred embodiment of the invention, the carrier assembly 20 is provided with a pair of parallel and longitudinally extending track guides having within each of the paired tracking guides a sufficient trackway facing to permit for an enclosed trackway portion and a trackway portion open for receiving a registering pair of track following guides thereupon.

The loading and unloading passageway of the entryway unit is substantially less than that afforded by either of the cargo assembly or ramp end section. The entryway unit will generally extend the passageway from about 10 inches to about 40 inches. In ramping devices for pick-up truck beds, the entryway unit typically extend the passageway from about 15 to about 35 inches and most typically from about 20 to about 30 inches. The casted ramped guides and stops 25 and 26 provide a particularly effective means and trackage for elevating the track following guides of the unit 30 to a higher elevational level and thereby causing unit 30 to provide an intermediate sloped ramp. Similar, but less effective results may be achieved by welding an inclining ramped section onto the carrier channel rails 21a and 22a.

With reference to FIG. 1, there is also disclosed a cleavis assembly 55 which locks the ramping device in a stored position for transport.

What is claimed is:

1. A retractable and extendable cargo bearing ramping device adapted to provide a plurality of ramping grades for the ramping of cargo onto a vehicle equipped with a cargo bed and an adjustable cargo access entryway which may be adjustably positioned to provide an extended cargo bed, said device comprising an elongated carrier frame member with said member including a cargo bearing platform for emplacement within said bed, a first longitudinally extending track guide and a second longitudinally extending track guide positioned in a substantially parallel relationship to said first guide, with said first track guide including a first adjacently positioned tracking guide portion having an access opening for receiving and guiding a track following guide thereupon and said second track guide including a second adjacently positioned tracking guide portion having an access opening for receiving and guiding a track following guide thereupon; an entryway extension unit adapted to telescopically engage onto and extend from said member onto an extended cargo bed of a vehicle, with said unit including a pair of longitudinal and parallel track guides and a pair of track following guides which correspondingly slideably engage and register onto said first track guide and said second guide of said member; a ramp end section fitted with a rearwardly pair of track following guides which respectively correspondently register onto said first adjacently positioned portion of said first guide and said second adjacently positioned portion with said section cooperatively engaging and contacting onto said unit and said member in a telescopically slideably relationship therebetween so as to respectively permit the unit and the section to telescopically extend from the member for the ramping of cargo thereupon and retract to a stowable position within said member; and means within said member for elevating the unit in a telescopically extended position to an intermediate ramping grade in relationship to the ramping grade afforded by the telescopically extended ramp end section to provide a cargo bearing ramping device wherein the ramping grade differential between the cargo bearing platform, the intermediate ramping grade of the unit and the ramping grade of the end section form a plurality of gradational ramping grades so as to permit a wheeled cargo of a low clearance to more effectively traverse and clear the ramping grades thereof.

2. The ramping device according to claim 1 wherein the means for elevating the entryway unit comprises a pair of internally disposed ramped guide members positioned respectively within the track guides and aligned therewithin so as to correspondingly register and interfacially engage onto the track following guides of the telescopically extended unit.

3. The ramping device according to claim 1 wherein said first track guide and said second track guide are respectively fitted with a terminal forward track guide restriction and a terminal rearward track guide restriction to form a restricted track passageway for the track following guides of the unit therewithin.

4. The ramping device according to claim 3 wherein the unit's pair of tracking guides are enclosed and are of sufficient length to bridge the extended cargo bed and the ramp end section is fitted with a pair of forwardly positioned track following guides which correspondly register onto the enclosed tracking guides of said unit in a slideably engaging relationship therebetween.

5. The ramping device according to claim 1 wherein the entryway unit's pair of track guides include a left unit track guide fitted with a rear left unit stop and a right unit which is disposed in a substantially parallel relationship to said left unit guide track guide and fitted with a rear right unit stop, and the ramp end section includes a left forward track following guide and a right forward track following guide respectively positioned for tracking upon said left unit track guide and said right unit track guide.

6. The ramping device accordingly to claim 5 wherein the first track guide and the second track guide are respectively fitted with a slotted and ramped track guide having an internally disposed track guide slot for trackage of the correspondingly registering track following guides of the unit thereupon and a slotted restriction to restrict further telescoping movement therewithin.

7. The ramping device according to claim 6 wherein the respective slotted guides include a beveled inclined facing portion for elevating the correspondingly registering track following guides of the unit thereupon.

8. The ramping device according to claim 6 wherein the ramped guide includes a projecting track aligning guide for longitudinally aligning the registering track following guide of the unit thereupon.

9. The ramping device according to claim 1 wherein the ramp end section's pair of track following guides include forwardly positioned track aligning guides, whereby said forwardly positioned aligning guides serving to longitudinally align the section following guides into a registering position for tracking upon the first and said second adjacently portion of said member.

10. The device according to claim 1 wherein the member's first and second track guides respectively define a restricted trackway terminated by a forward track following guide stop and a rearward track following guide stop, the entryway unit's pair of track following guides respectively slideably engage and register onto the restricted trackway of the tracking guides of the member, and a pair of parallel entryway tracking guides laterally and longitudinally disposed between the tracking guides of the member with said entryway guides further being respectively equipped with a forward entryway track following guide stop and a rearward entryway track following guide stop, and the ramp end section includes a pair of registering forwardly positioned section track following guides which correspondly slideably engage and register onto the entryway tracking guides.

11. The device according to claim 10 wherein the entryway unit provides a cargo loading and unloading passageway between said member and said section measuring from about 20 to about 30 inches.

* * * * *